Oct. 9, 1923.
J. A. BOWDEN
SPRING INSERT FOR DUST CAPS
Original Filed Oct. 8, 1920
1,469,882
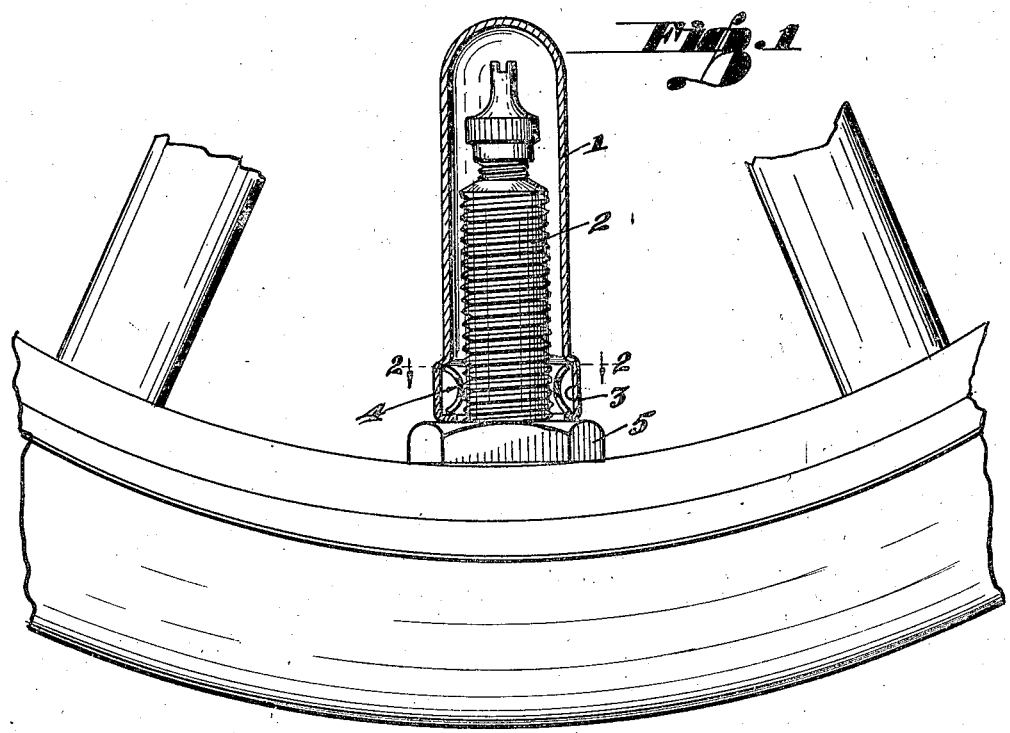
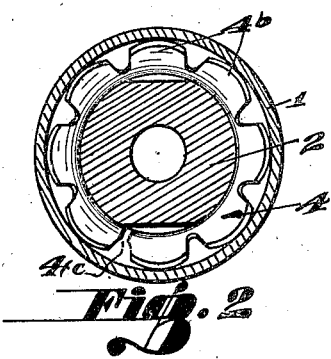
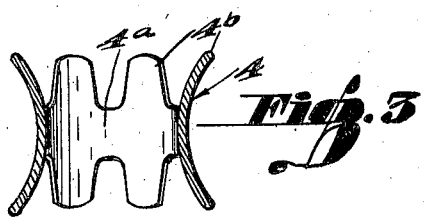
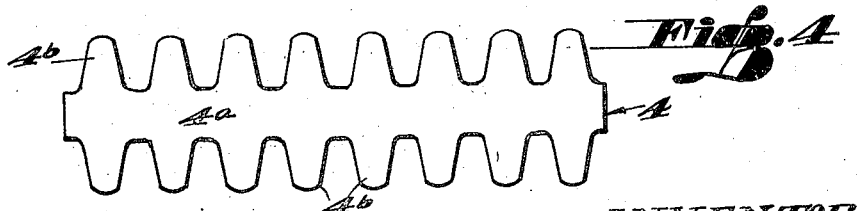
INVENTOR
Junius A. Bowden Patented Oct. 9, 1923.

1,469,882

UNITED STATES PATENT OFFICE.

JUNIUS A. BOWDEN, OF LOS ANGELES, CALIFORNIA, ASSIGNOR TO A. SCHRADER'S SON, INCORPORATED, OF BROOKLYN, NEW YORK, A CORPORATION OF NEW YORK.

SPRING INSERT FOR DUST CAPS.

Application filed October 8, 1920, Serial No. 415,657. Renewed March 6, 1923.

*To all whom it may concern:*

Be it known that I, JUNIUS A. BOWDEN, a citizen of the United States, residing at Los Angeles, in the county of Los Angeles, State of California, have invented new and useful Improvements in Spring Inserts for Dust Caps, of which the following is a specification.

This invention relates to quick detachable dust caps for tire valve stems.

The object is to provide a simple and inexpensive combination of a spring insert and a cap, forming unit of the parts which is adapted for slidably engaging the valve stem in spring tight connection.

The main object is to provide a specially constructed spring that will have a greater range of flexibility and endurance, compared to my previous invention, described in pending application, Serial No. 365923.

These and other objects of the invention will be brought out in the foregoing specifications and appended claims.

Referring to the drawings. Fig. 1 shows a front elevation in section of my dust cap and spring insert mounted upon the threads of a tire valve stem, as employed in connection with a tire. Fig. 2 is a cross section 2—2 of Fig. 1. Fig. 3 is a longitudinal section, of my spring insert. Fig. 4 shows a flat form of the insert, before being shaped, as of Fig. 3.

Referring more particularly to the details, cap 1 is formed with an inner recess 3, adapted to receive and retain the spring insert 4. My spring insert 4, as shown, is provided with an annular central body portion or band 4ª, having two rows of branch members 4ᵇ, formed integral with the body portion, one row on each side. These members curve or flare outwardly, somewhat in a semi-circle shape and the ends of the members are adapted to engage the recess 3, of the cap. By such a construction the body portion 4ª has a smaller diameter than the diameter of the valve stem 2, so as to provide spring tension when the cap is pressed forward with the insert mounted therein. The members 4ᵇ will yield on account of their spring action and permit the cap to slide thereon and the cap will seat itself on nut 5. The spring resistance of the double row of branch members bearing against the walls of the cap, will hold the body portion of the spring in tight engagement with the threads of the valve stems and prevent displacement of the cap.

This novel construction of a spring insert for the purpose intended, is a decided improvement over the insert shown in my pending application referred to herein, it provides for greater flexibility and longer life of the spring, because in place of the branch members slidably engaging the threads of the valve stem as in my former application, these branch members of my improved insert become as spring acting supports for the main body portion 4ª.

It is possible to provide modified forms of springs that would incorporate the essential elements of my improved spring insert, without departing from the spirit of my invention.

Having described my invention, what I claim is:

1. In dust caps for tire valve stems, a spring insert provided with a central body portion and an outwardly flaring branch member formed on each side of the body portion, a cap provided with an inner recess, the outer ends of the branch members adapted to engage said recess and said body portion adapted to engage a tire valve stem.

2. In dust caps for tire valve stems, a spring insert provided with a central body portion, having numerous outwardly flaring branch members formed integral therewith on each side of the body portion, said body portion in the from of a split band, a cap provided with an inner recess, the outer ends of said members adapted to engage said recess and said body portion adapted to engage a tire valve stem in spring tight connection for the purpose described.

3. In dust caps for valve stems, a band provided on each side with a series of outwardly projecting spring members, said members adapted to engage a dust cap and said band adapted to engage a valve stem.

4. In dust caps for valve stems, detachable spring means in combination with a dust cap, said means comprising a body portion having numerous spring members, said members adapted to engage the inner wall of the cap causing slidable spring tension when the cap is mounted on a valve stem.

In testimony whereof, I have hereunto set my hand, at Los Angeles, California, this 30th day of September, 1920.

JUNIUS A. BOWDEN.